(12) United States Patent
Leason

(10) Patent No.: US 7,426,055 B2
(45) Date of Patent: Sep. 16, 2008

(54) OPTICAL DISC SUPPLY AND INTERFACE FOR DIGITAL COPIER MACHINE

(75) Inventor: David Leason, Chappaqua, NY (US)

(73) Assignee: Leason Holdings Company, L.L.C., Chappaqua, NY (US)

(*) Notice: Subject to any disclaimer, the term of this patent is extended or adjusted under 35 U.S.C. 154(b) by 983 days.

(21) Appl. No.: 10/649,883

(22) Filed: Aug. 26, 2003

(65) Prior Publication Data
US 2005/0046897 A1    Mar. 3, 2005

(51) Int. Cl.
G06F 3/12 (2006.01)
G06K 15/00 (2006.01)

(52) U.S. Cl. .................. 358/1.16; 358/1.1; 358/523

(58) Field of Classification Search .............. 358/1.1, 358/1.9, 1.11–1.18
See application file for complete search history.

(56) References Cited

U.S. PATENT DOCUMENTS

| | | | |
|---|---|---|---|
| 4,551,966 A | 11/1985 | Hirose et al. | |
| 5,016,114 A | 5/1991 | Sakata et al. | |
| 5,105,284 A | 4/1992 | Sakata et al. | |
| 5,666,211 A | 9/1997 | Tahara et al. | |
| 5,692,878 A | 12/1997 | Freund | |
| 5,718,559 A | 2/1998 | Freund | |
| 5,788,114 A | 8/1998 | Perego | |
| 6,123,020 A | 9/2000 | Wolfer et al. | |
| 6,498,658 B1* | 12/2002 | Sekikawa | 358/1.16 |
| 6,760,052 B2* | 7/2004 | Cummins et al. | 347/171 |
| 2001/0035972 A1 | 11/2001 | Wurmfeld | |
| 2002/0054362 A1 | 5/2002 | Chen | |
| 2003/0084105 A1 | 5/2003 | Wiley et al. | |

* cited by examiner

Primary Examiner—Edward L Coles, Sr.
Assistant Examiner—Thierry L Pham
(74) Attorney, Agent, or Firm—Lenson Ellis LLP

(57) ABSTRACT

Disclosed are improvements in digital copier machines and methods for controlling an output job to issue onto a removable digital storage media. A drive unit is provided and configured to removably receive a removable digital storage medium such as an optical disc. A picker mechanism is configured to deliver the removable digital storage medium to the drive unit from a supply of a plurality of removable digital storage media in response to a load drive unit signal. A selector is provided on the interface and operational logic is provided which is responsive to a user selection of the selector to issue the load drive unit signal and to convey the digital data between the control unit of the digital copier machine and the drive unit.

20 Claims, 4 Drawing Sheets

OPTICAL DISC SUPPLY AND INTERFACE FOR DIGITAL COPIER MACHINE

FIELD OF THE INVENTION

The invention concerns improvements in digital imaging devices such as the type conventionally used to produce copies of paper documents, and, more particularly, to an optical disc interface for such devices which receives optical discs as a user-selectable source for previously imaged documents and which selectively supplies and outputs optical discs as an output medium, in lieu of paper, for documents that have previously or are presently being imaged.

BACKGROUND OF THE INVENTION

Conventional electrophotographic copiers are stand-alone machines that receive documents from users, either individually or in bulk, and photocopy these on an immediate basis. Copies are dispensed directly from the machine as they are produced. If multiple copies have been printed, these must be individually distributed to their recipients, some of whom may be physically located far from the machine.

The advent of high-speed scanners and laser printers has opened the possibility of using computational resources to automate the printing process. A document need only be scanned into digital form a single time; it is saved as a file on a print server (or, more typically, on a file-server computer accessible to the print server via a network) and transmitted by the print server to the selected printer in a format readable by its print engine.

Digitally represented or imaged documents ("digital documents") may also be sent to destinations other than local printers, e.g., to other network-connected users via local e-mail, or to an Internet server for remote distribution or printing on a remote printer. An interface as described in U.S. Patent Application Publication No. 20010035972 of Wurmfeld, entitled "Adaptive interface for digital printing systems" can be used to select a destination for a digital document. However, such an arrangement involves addressing the digital document to a destination which complicates the task of transporting the digital document in that it requires further input data from the user to provide the destination address as well as knowledge of the appropriate destination address for that document. The digital document addressed in this manner is still tied to a network rather than being in a transportable form (such as paper). Also persons who need access to the digital document must have access to the destination network and such access can complicate or hamper the transportability of the digital document. Similar problems were addressed in U.S. Patent Application Publication No. 20030084105 of Wiley et al., entitled "Methods for providing a remote document history repository and multifunction device," in which delivery data for sent documents is stored on a network device that is remote from a scanner.

U.S. Patent Application Publication 2002/0054362 of Chen, entitled "Paperless image fax-scanning apparatus," describes a fax machine that scans and faxes documents, and which can also store the data of scanned documents on a floppy disc or other memory device for further processing.

Techniques for supplying optical discs for use in downstream processes (such as packaging and disc duplication) are known in the art, but none have been adapted either structurally or communicatively for use in a copier machine to solve the problems recognized by the present inventor.

For mechanisms that supply optical discs from stacks, see EP-B-0-067 073; U.S. Pat. No. 5,788,114 of Perego, and in particular the mechanism 100 described in connection with FIG. 10 thereof; and U.S. Pat. Nos. 5,718,559 and 5,692,878, both of Freund. Each of these designs is constructed with certain considerations in mind, the '878 patent, for example, providing an arrangement that permits a compact device with a low physical height and secure handling of the CDs in an automated environment.

SUMMARY OF THE INVENTION

The invention provides improvements in digital copier machines of the type that have a platen for capturing a source document in the form of digital data representative of the source document and which include at least one paper bin for supplying paper onto which the digital data can be transformed into a printed image in response to signals issuing from a control unit based on selections made at an interface.

In accordance with a first aspect of the invention, an improved digital copier machine of this type includes a drive unit connectable to the control unit and which is configured to removably receive a removable digital storage medium and which is further configured to perform read and write operations on any removable digital storage medium received therein. A picker mechanism is configured to deliver the removable digital storage medium from a supply of a plurality of removable digital storage media to the drive unit in response to a load drive unit signal. A selector is provided on the interface and operational logic is provided which is responsive to a user selection of the selector to issue the load drive unit signal and to convey the digital data between the control unit of the digital copier machine and the drive unit.

The drive unit in accordance with a further aspect of the invention has two accesses through which removable digital storage media can be received, wherein the picker supplies media to be received at a first access and a user supplies media to be received at a second access, the first and second accesses being different than one another. In accordance with this aspect of the invention, the picker can be centrally positioned relative to plural supplies of respective pluralities of removable digital storage media. Also, a lift can be provided and be operative to simultaneously elevate the vertical stacks of removable digital storage media in each of the supplies.

In accordance with still a further aspect of the invention, a method for controlling a job output of a digital copier machine of the type that provides copies of an image contained on a source document onto an output medium such as paper is provided. In accordance with this method, a user interface is provided which has a display and a set of entry options, one of the entry options permitting a user to select the output medium for the job. A user selection is received through the user interface which sets the output medium for the job to be a removable digital storage medium. A removable digital storage medium is automatically loaded from a supply onto a drive unit in response to the user selection. Thereafter, a copy of the source document is transferred to the removable digital storage medium in the drive unit.

Additional features and advantages are evident from the description of the embodiment of the invention depicted in the drawing.

DETAILED DESCRIPTION OF AN EMBODIMENT OF THE INVENTION

Figure 1:
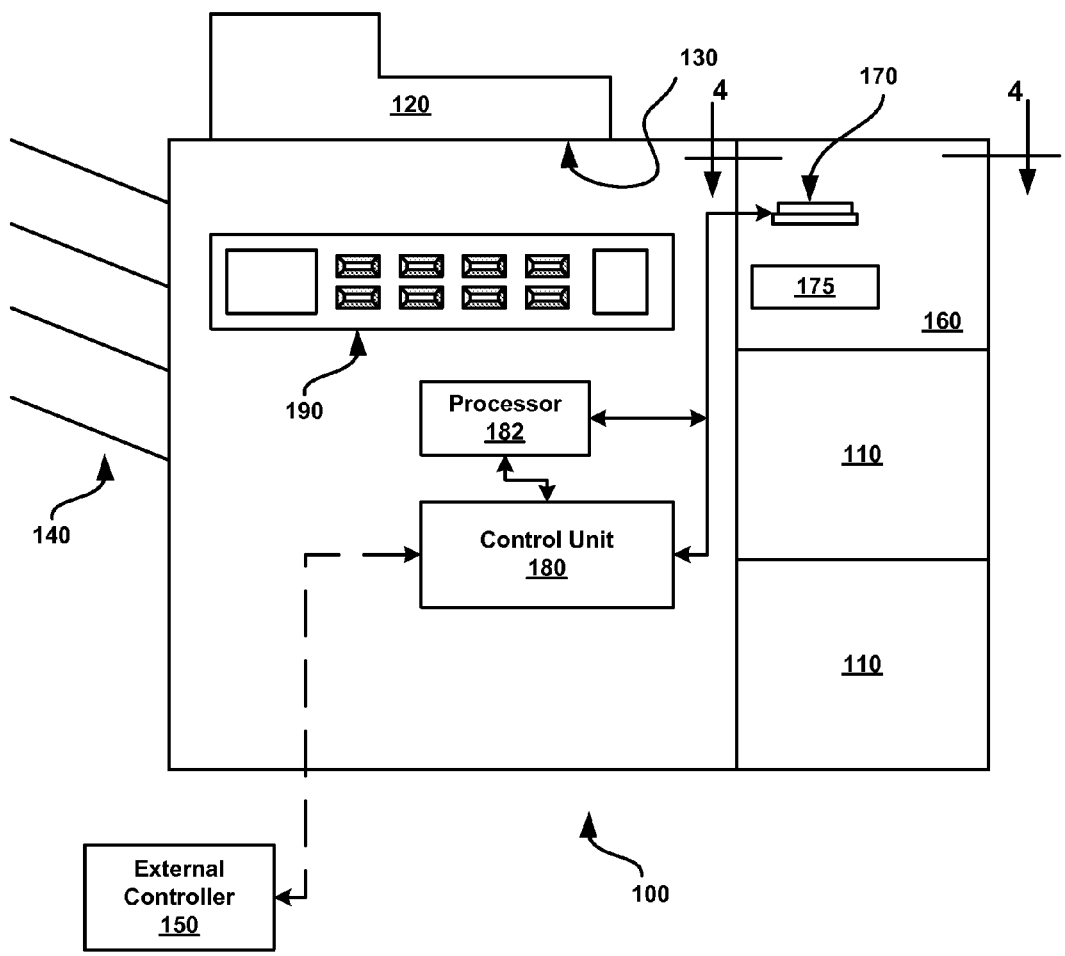
FIG. 1 shows a digital copier machine adapted to practice the present invention.

By way of overview and introduction, a digital copier machine 100 is illustrated in FIG. 1, which has been adapted to handle optical discs in accordance with a preferred embodiment of the invention. Other types of removable digital storage media can be used in lieu of optical discs including magnetic storage disks (e.g., hard disks or floppy disks) and solid-state memory device (e.g., flash memory cards), provided that they are portable.

The digital copier machine 100 includes multiple paper bins 110 of conventional design which are configurable to store a supply of paper of prescribed size (e.g., letter, A4, etc.). A document to be copied can be introduced via an automatic document feeder (ADF) 120 that serially draws pages of a source document over a platen 130 through which the information on the source document (e.g., an image) is captured as digital data representative of the source document and thereafter reproduced or transformed into a printed image on paper supplied from the bins 110. One or more copies can be generated at one time in a conventional manner and delivered to paper destination slots 140 in response to signals issuing from a control unit 180 based on selections made at an interface 190. An external controller 150 such as available from EquiTrack permits the quantity of copies being made in a given job to be assigned to an account such as a particular matter or project, and captures data identifying the user who caused the job to be started.

As an improvement in such digital copier machines, the machine 100 is further equipped with a supply of removable digital storage media 160 and a drive unit 170 compatible with such media. In the preferred embodiment, the storage media are optical discs and the following description is made in connection with that embodiment.

FIG. 1 illustrates the supply and drive unit 160, 170 as being configured to occupy the space ordinarily reserved for one or more paper bins 110. The supply 160 can provide optical discs to the drive unit 170 for conventional read and write operations by which digital data representative of the source document can be written to the optical disc or read from the optical disc. More specifically, the machine 100 is capable of generating a digitally represented or imaged document from a source document for reproduction onto one or more paper copies under control of a control unit 180 of the digital copier machine 100. The drive unit 170 is communicatively coupled to the control unit 180 in order to permit an exchange of signals therebetween and to permit data to be read from and written to an optical disc removably received therein. Such communications can be, for example, via a peripheral card interface (PCI) of the machine 100. As a result, the drive unit can write digital documents that have just been scanned at the platen 130 to the optical disc, in addition to or in lieu of a paper output, and the drive unit can also source digital documents to the control unit 180 for outputting onto paper contained in the paper bins 110.

Other configurations for the supply and drive unit are within the scope of the present invention. For example, the supply 160 and drive unit 170 can be external to the machine 100 and connected for electrical communication therebetween. For the great number of machines 100 presently in the marketplace, this latter arrangement is preferred. Communication between the control unit 180 and the drive unit 170 is the same regardless of where the supply 160 is physically located, but if the drive unit 170 is external to the digital copier machine, communications can be over a universal serial bus (USB) interface, a small computer system interface (SCSI), or other network interface.

By providing an optical disc (or other information media) supply 160 in addition to the paper bins 110, a user of the machine 100 has additional options available for handling digitally represented data, as may be selected via selectors on a user interface 190 located on an exterior panel of the digital copier machine. Specifically, there are four scenarios available to the user that previously were not a directly available option: (1) the user can transform a source paper document into a digital file which is output onto one or more optical discs at the end of the copy job in lieu of a printed output; (2) the user can transform a source paper document into a digital file which is output onto one or more optical discs at the end of the copy job in addition to generating one or more printed copies; (3) the user can transform a source digital file into one or more printed copies of the file; and (4) the user can reproduce a source digital file into one or more additional digital files output onto one or more optical discs. A machine 100 so equipped therefore can intake and distribute optical discs without requiring the user to enter a file name (though one could be provided to change a default setting) or a network address, and without requiring the user to locate a machine with a suitable read/write drive and an optical disc to use for that job so that the file can be uploaded from the designated network location to that disc. Operational logic is provided and associated with one or more of the foregoing components to respond to and handle selections made at the user interface 190.

Figure 2:
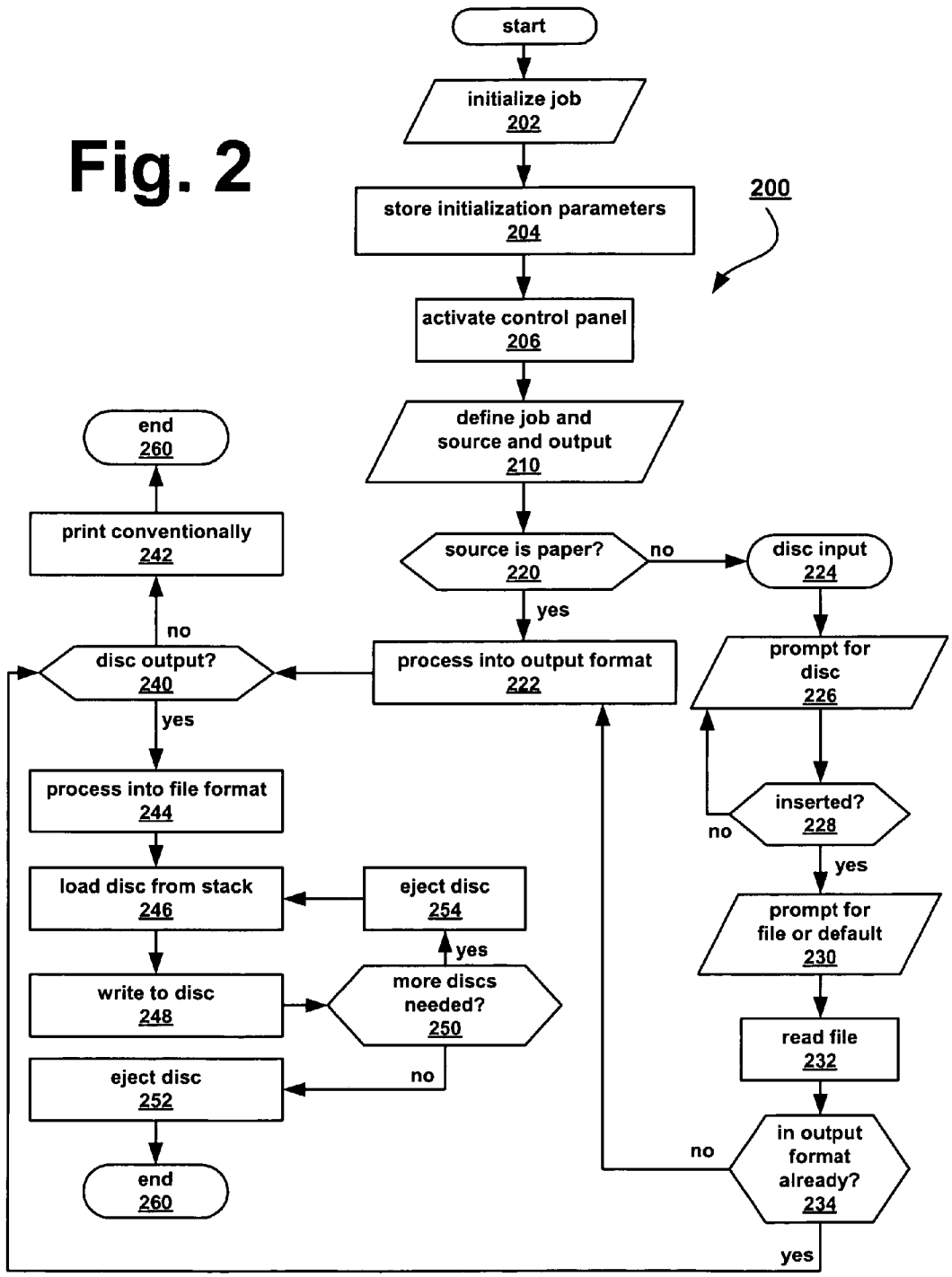
FIG. 2 is a flow chart illustrating a user-driven operational sequence for the digital copier machine of FIG. 1.

Referring now to FIG. 2, an operational sequence 200 for the digital copier machine of FIG. 1 is described as a preferred implementation of the operational logic. The operational sequence can include inputs received from a user through the user interface 190 and is preferably implemented in a programmed processor 182 executing a software program or in a programmed logic unit associated with the supply and drive unit 160, 170. The operational logic is in communication with the control unit 180 of the machine to govern the machine 100. Alternatively, the program that implements the operational sequence 200 can be resident in the control unit 180. The programmed processor 182 coordinates the operations of the machine 100 in accordance with inputs provided by the user so that the operational logic can convey digital data between the control unit and the drive unit. As described further below, the operational logic responds to user selections at the interface to selectively issue a load drive unit signal which causes the drive unit 170 to be loaded with a removable digital storage medium from the supply 160.

The operational sequence 200 starts with the initialization of a particular job, as indicated at step 202. Initialization can include, for example, entry at the external controller 150 of the user's identification (e.g., an employee number, telephone extension, social security number or fragment, etc.) and project identification for tracking or billing purposes (e.g., a project identifier or a client and matter number). These data are stored (remotely or locally) at step 204, and thereafter the user interface panel 190 is activated, at step 206. In certain implementations in which a controller such as external controller 150 is not utilized, the operational sequence can start at step 206, with the user interface in an activated state. These initial steps can be governed by the PLU or by control signals issued directly by the controller 150.

At step 210, the user defines the parameters of the job to be performed by the digital copier machine 100, including: the number of copies; the source (paper or removable media); the type of output (paper or removable media) and, if the output is to be printed, the size of the paper to use; any magnification; Bates(TM) numbering; watermarking; or other alterations to the output version of the source document. Some of these parameters are preferably set automatically. For example, if the user inserts an optical disc into the drive unit 170, the source can be automatically set to be a file on the optical disc. On the other hand, if paper is fed into the ADF 120, then even if an optical disc has been inserted into the drive unit 170 (for example, if the user wishes the output file to be placed on that disc), the source can be automatically set to be the document in the ADF. The user at the user interface panel 190 can override any setting made automatically and can enter other parameters as appropriate through a set of entry options made available at the interface 190, through a display or dedicated selector or button.

The job commences and the process flow continues when the user presses a "start" key on the user interface panel 190.

At step 220, a determination is made as to whether the source to be copied is a printed document or a file on a disk based on the settings that were made (either manually or automatically) prior to pressing the start key. The operational sequence branches based on that determination. If the image source was paper ("Yes"), then the source document can be processed into an output format at step 222. This step, for example, can comprise processing a source document into a portable document format ("PDF"), a file format that is suitable for describing documents containing any combination of text, graphics, and images in a device-independent and resolution-independent format. These documents can be one page or thousands of pages, very simple or extremely complex with a rich use of fonts, graphics, color, and images. This file format is presently preferred because it can represent a source document in a manner that is independent of any particular application software, hardware, and operating system that may have been used to create the document. A test is then made at step 240 to determine what manner of output the user has selected for this job via the interface 190. If the output is to be a printed document, no processing need by performed or different processing at step 222 can be performed; however, such a document flow (printed source to only a printed output) is not within the scope of the present invention.

On the other hand, if the image source was an optical disc ("No" at step 220), then a disc either has been or is to be input by the user. In this case, a sub-process ("disc input") starts at step 224 in which the user is prompted at step 226 to input a disc at an external access point to the drive unit 170 (but only if a disc has not already been inserted) and the process awaits confirmation of disc insertion by a test at step 228. The user is prompted at step 230 to select a file from the disc if there is more than one file on the disc. If there is only one file on the disc, or perhaps if it has a default file type extension, the file can be read at step 232 without prompting for a file selection. If the file read at step 232 is not in a PDF format or other format suitable for outputting onto paper or as a portable file, as tested at step 234, then the file is processed at step 222 as described above. Otherwise, if the file read at step 232 has been pre-processed into a prescribed format (e.g., PDF), then process flow continues at step 240.

At step 240, a determination is made as the manner of output set for this job. The output for a job is set by the user or automatically to be paper or a removable digital storage medium such as an optical disc. The user is permitted to make this selection via the selectors on the user interface. Illustratively, the test is shown as testing whether a disc output has been selected, although the determination could equally well test whether a printed output has been set for this job. If a disc output has not been set, a conventional printed output is provided at step 242 and the process ends at step 260. On the other hand, if the job has been set for a disc output, the data that was read at the platen 130 or at the drive unit 170 is preferably processed or converted into a prescribed digital document format (if not already in a prescribed format) at step 244.

If the user has not inserted his or her own optical disc into the drive unit 170, an optical disc (e.g., CD) is loaded into the drive unit from a supply preferably included in a stack magazine 320 (see FIG. 3) at step 246. Preferably, this step is performed automatically in response to the selection of a disc output and includes the issuance of a load drive unit signal (e.g., by the control unit 180, the drive unit 170, or the programmed processor 182 executing the operational logic) which causes a picker mechanism 340 to deliver an optical disc (or other removable digital storage medium) from the supply 160. The data is written (by which it is also meant other manners of data transfer) in the prescribed format onto the loaded CD at step 248 in a conventional manner. Optionally, data concerning a job identifier, as defined below, can also be written to the removable digital storage medium.

Depending on the size of the data file, it is possible that multiple CDs may be required to complete the write operation. If only one CD is required to write the data, a test at step 250 determines that no more CDs are needed, and causes the CD in the drive unit 170 to be ejected at step 252 and the process ends at step 260. On the other hand, if the test at step 250 determines that more CDs are needed to complete the write operation, the CD in the drive unit 170 is ejected at step 254 and a further CD is loaded from the stack magazine at step 246 to continue the writing operation of step 248. In view of the great volume of data that can be contained on a single CD, the need for multiple CDs to accommodate a given job is unlikely. The ADF 120 is more likely to require replenishing before a CD is filled, and the operational sequence accounts for this contingency when the disc output has been set by not terminating the write file operation until the entire source document has been processed. When the test at step 250 finally determines that no more CDs are needed, the CD now in the drive unit 170 is ejected at step 252 and the process ends at step 260.

Optionally, a printer 175 provides visible information to the exterior surface of the optical disc concerning the job being output to optical disc. For example, the information can include a job identifier such the name of the user (which is associated with the user identification number), the project or client/matter that was charged for the job, and other identifying information such as the date the copy was made, the total number of copies made during that job, and special identifiers based on the job definition from step 210 (such as a confidentiality notice, a copyright notice, an attorneys-eyes-only notice, or a privileged document notice). The printer 175 can write directly onto the optical disc or onto a label that is attached or attachable to the disc. A simple dot matrix printer is used such as the SIGNATURE®™ printer together with an ink jet cartridge. The printer and cartridge are movable in a conventional manner in a two-dimensional matrix to impart ink in the form of alphanumeric characters to the disc or label.

Figure 3:
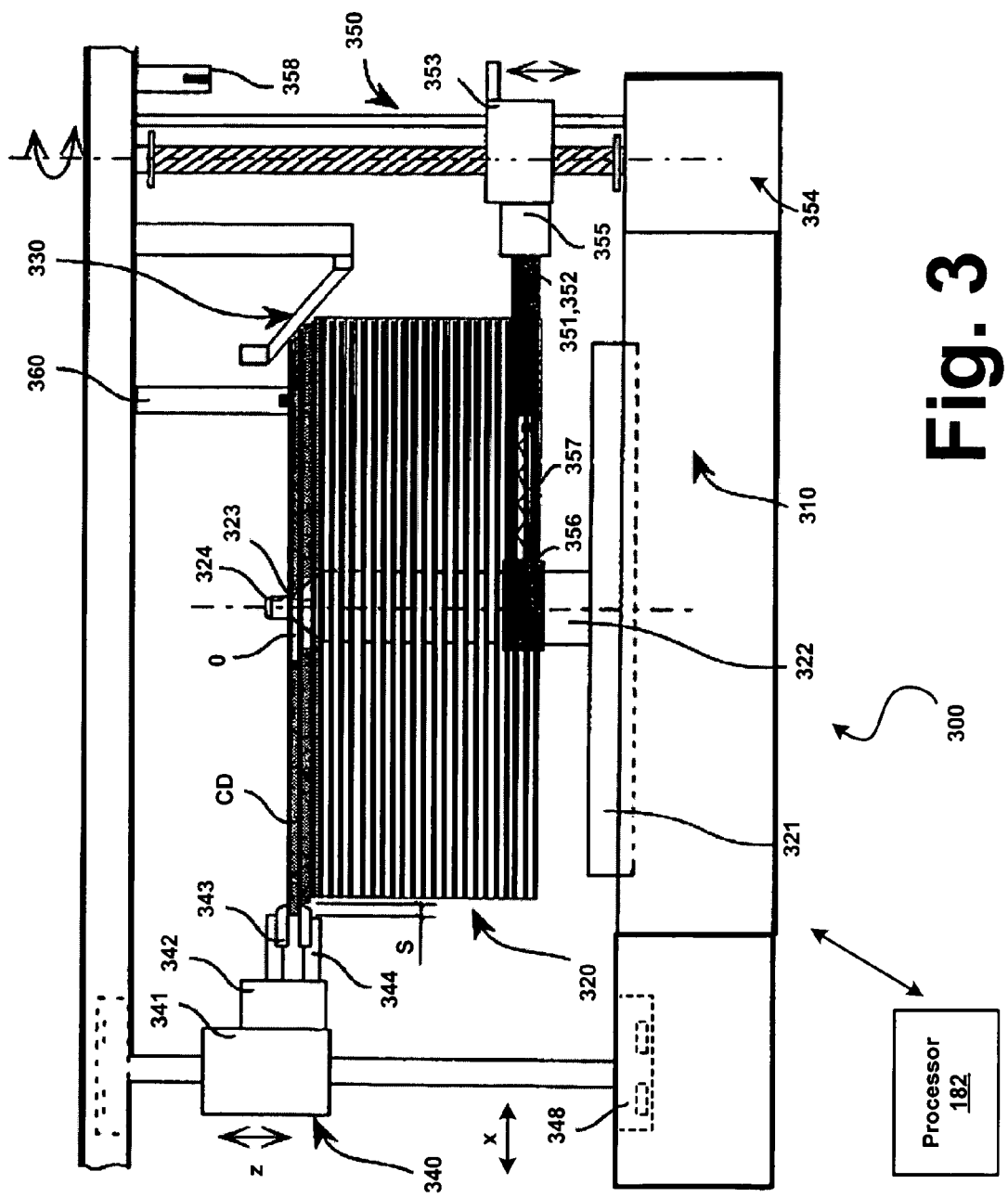
FIG. 3 shows an operative portion of a picker-assembly useful in the preferred embodiment of the invention, in side view, without a housing and partly in section.

With reference now to FIG. 3, a disc handling mechanism 300 is described. The disc handling mechanism is configured to pick from a stack a topmost optical disc or other plate-shaped object having a central opening, such as 5.25' (13.34 cm) floppy disks or annular hard disks.

The disc handling mechanism is shown in an operating position in which a stack of CDs has been lifted into a so-called removal position. The mechanism 300 includes a magazine support 310, which for example is arranged in a playback/recording device (not shown) for compact discs; a stack magazine 320, replaceable in a known manner, with CDs stacked on top of one another; a displacement mechanism, configured as leaf spring 330 for CDs in an upper region of the stack magazine; a picker mechanism 340 for gripping and delivering an individual CD to the drive unit 170; and a lifting mechanism 350 for elevating the CD stack. In addition, a sensor mechanism 360 for detecting that a topmost CD of the stack has been lifted into a removal position is arranged in the upper part of the stack magazine.

Stack magazine 320 includes a horizontally oriented base plate 321 with a diameter slightly less than that of the compact disk (CD), and a preferably cylindrical shaft 322 in a vertical orientation, arranged in the central axis of the base plate, such that the shaft passes through the central openings of the compact disks (CDs) of the stack and thus ensures that the stack is held and aligned in the vertical direction.

Shaft 322 has at its top end an upwardly tapering region 323, this region being configured in the shape of a cone, which ends at the top in a cylindrical terminating piece 324 with threads that are used for mounting a protective shroud (not depicted).

Tapering region 323 of the top end of the shaft or cone is configured so that the CDs of the stack lifted into this region can be displaced by leaf spring 330 in a horizontal direction against shaft 322 in such a way that the topmost CD of the stack can be gripped by means of picker mechanism 340. In this context the topmost CD, because of the selected slope of the cone, can be offset with its outer rim in a horizontal direction by a predetermined distance with respect to the stack so that this CD can be grasped at its outer rim that faces away from leaf spring 330.

Leaf spring 330 for displacing at least one CD of the stack is arranged alongside stack magazine 320 and parallel to the region or extent of tapering region 323 of shaft 322. The leaf spring provides a displacement force that acts in a radial direction on the outer rim of the topmost CD or CDs, and a spring-loaded inclined ramp for the outer rim of the CD or CDs is thereby defined. Leaf spring 330 is mounted in a known manner on a (schematically depicted) housing wall.

To prevent displacement and for insertion of the stack magazine into the device in the correct position, magazine support 310 has a recess to receive base plate 321 of the stack magazine.

Picker mechanism 340, which is arranged on the side facing away from leaf spring 330 and alongside the stack magazine, can be moved in a known manner in the vertical and horizontal directions by means of microprocessor-controlled X and Z drive units 348 and 341 (depicted schematically), and has upper 343 and lower 344 gripping arms, movable vertically by means of a further generally known drive unit 342, for grasping the projecting outer rim of the topmost CD of the stack.

Lifting mechanism 350, which is arranged alongside each stack magazine 320 and in the region of leaf springs 330, has, in order to lift the stack of CDs, horizontally pivotal lifting arms 351, 352, which are provided in order to surround at least two of the lowest compact disks (CDs) of each vertical stack magazine 320 at their outer rim and at diametrically opposite points of their outer periphery. Lifting arms 351, 352 are arranged on a vertically movable slide 353 so that during lifting, they can be moved by means of a generally known microprocessor-controlled spindle drive unit 354 (depicted schematically) into the upper region of the stack magazine past the outside of leaf spring 330. To perform the horizontal pivoting movement of lifting arms 351, 352, a generally known microprocessor-controlled eccentric drive unit 355 is installed on slide 353 to pivot the lifting arms into engagement with the outer rim of the lowermost CD.

Arranged on lifting arms 351, 352 of lifting mechanism 350 are clamping jaws 356 with gripping surfaces that are made of an elastic material and have V-shaped depressions or a lamellar structure on the gripping surfaces to receive the outer rim of the CDs, in such a way that the lowest CDs grasped by the lifting arms of the lifting mechanism can, in the removal position at upper end of shaft 322, be displaced in the horizontal direction by means of leaf spring 330 inside or between the clamping jaws, and can be gripped by picker mechanism 340.

In order for lifting arms 351, 352 to grip the two lowest CDs of the stack, base plate 321 of stack magazine 320 has a height greater than the recess in magazine support 310, so that the lowest CD of the stack is at a distance from the top of the magazine support.

In a further embodiment of the mechanism 300, on the one hand, for easier displacement of the lowest CDs held or clamped by means of lifting arms 351, 352, clamping jaws 356 are arranged so as to permit displacement horizontally in the direction of picker mechanism 340 against the spring force of spring 357, and on the other hand the leaf spring 330 is replaced by a roller (not shown) that is spring-loaded against the topmost CD; a so-called friction roller, driven by a drive unit, which could rest on the top surface of the topmost CD of the stack in order to displace the topmost CD of the stack horizontally, could also be used.

The disc handling mechanism 300 operates as follows:

First a stack magazine 320 fully loaded with compact disks (CDs) is placed into the recess of magazine support 310 from the side where picker mechanism 340 is arranged. The picker mechanism is located outside the insertion region in a transfer position (X direction) not depicted or processing station for a CD, lifting arms 351, 352 of lifting mechanism 350 are located in an opened outer position in the region at the lower end of the stack, and the CD stack is located in a lowered position on the stack magazine (depicted in dashed lines), in which leaf spring 330 are not in engagement with the topmost CD of the stack.

Subsequently, in accordance with a program sequence of the operational logic 182, drive units 354, 355 of lifting mechanism 350 are activated in such a way that first of all lifting arms 351, 352 surround the two lowest CDs of the stack with their clamping jaws 356, and then the entire CD stack is lifted.

During the upward movement of the stack, the topmost CD or CDs of the stack, as soon as they enter the region of leaf spring 330, are displaced horizontally against tapering region 323 of magazine shaft 322.

As soon as the topmost CD of the stack is detected by a sensor (e.g. reflection photoelectric barrier) of sensor mechanism 360, spindle drive unit 354 of lifting mechanism 350 is stopped, and picker mechanism 340 is moved by means of its X and Z drive units 348, 341 into a position to grip the topmost, projecting CD.

Once this position is reached, drive unit 342 for the lower and upper gripper arms 343, 344 is activated, and the topmost CD is gripped at its projecting outer rim. The disc feeder can remain in this state until a user requests a printing operation in which the output is to be directed to a disc. When such an operation is commenced, then the topmost CD can be transported by means of picker mechanism 340 to an internal (first) access of the drive unit 170 and can be set down there.

This process repeats until all the CDs have been removed from stack magazine 320, and lifting mechanism 350 is in a top end position detected by means of a further sensor mechanism 358.

Lastly, picker mechanism 340 and lifting mechanism 350 are moved into their starting positions described above, and the stack magazine can once again be changed. An alert preferably appears at the user interface 190 advising that the optical disc supply must be replenished.

Figure 4:
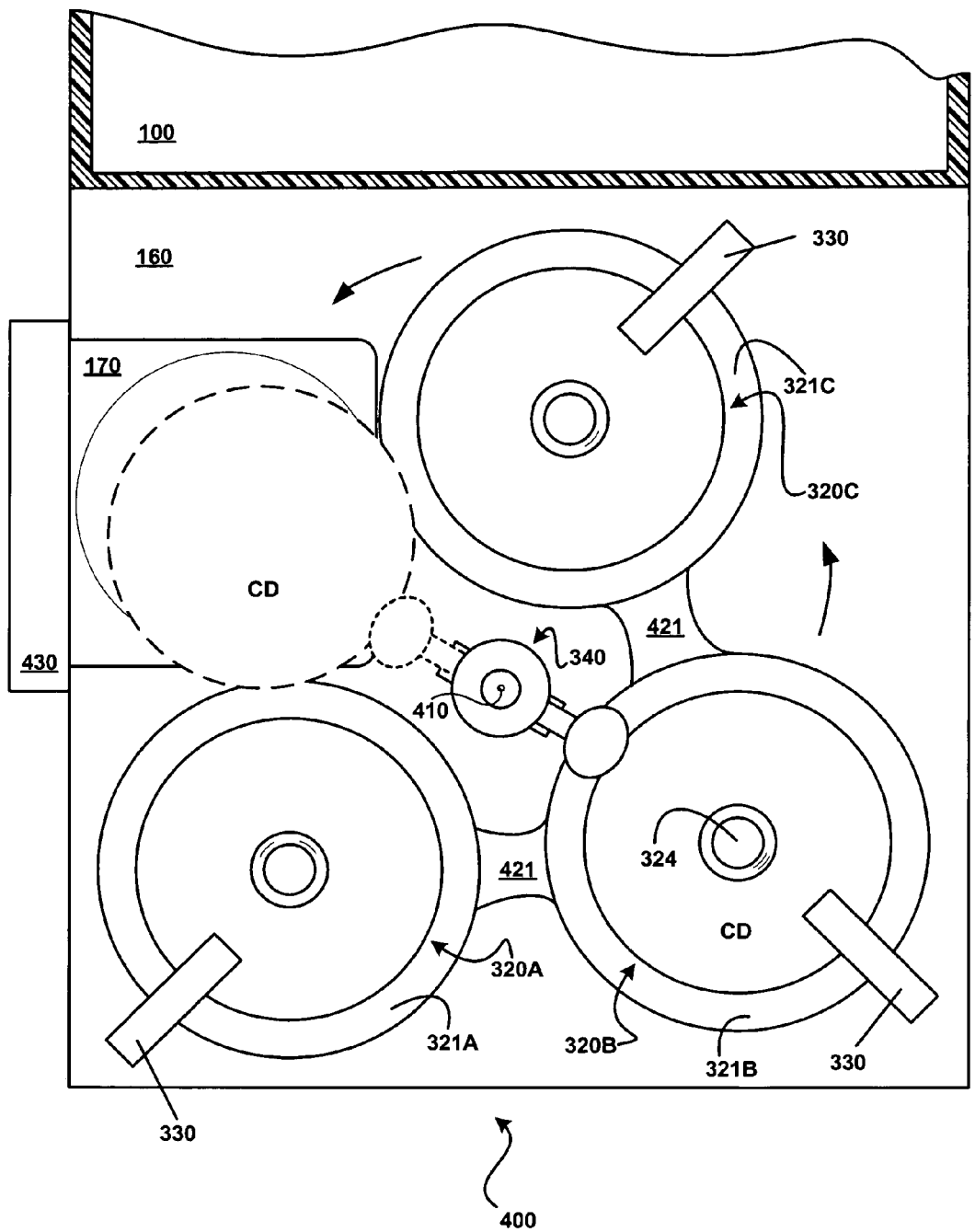
FIG. 4 is a top plan view taken along line 4-4 of FIG. 1 of a housing for an optical disc supply that includes a plurality of magazine stacks combined with a drive unit for read and write operations on optical discs, the housing being in a form suitable for replacing a conventional paper bin of a digital copier machine, in accordance with a preferred embodiment of the invention.

FIG. 4 illustrates a preferred embodiment in which several stacks of CDs are combined within a single tray 400. As illustrated, tray 400 serves as a magazine support for three stack magazines 320, although additional or fewer stacks can be provided for a given implementation. Each stack magazine includes a vertical stack of CDs with a displacement mechanism 330 positioned in an upper region of the stack, as previously described. In this embodiment, the plural stacks are serviced by a centrally disposed picker mechanism 340 which can grip an uppermost, individual CD from any of the plural stacks and rotate about its axis to deliver a picked CD to the first access of the drive unit 170. Preferably, the picker mechanism is governed by the operational logic included in the machine 100 and responds to load drive unit signals.

Each of the stacks can have its own lifting mechanism 350, or the stacks can be lifted together with the picker mechanism operative to pick a CD from each stack before the lift is engaged again. In this way, a common lift mechanism can be utilized to lift all of the stacks simultaneously and have the respective displacement mechanisms 330 displace the upper CDs in their own stacks. At the same time, the picker mechanism revolves and/or translates to select a displaced CD and position that CD on the drive unit 170. Thus, for example, CDs at the upper regions of the stacks 320A, 320B, 320C can all be displaced due to elevation of the lifting arms (351A, 352A, 351B, 352B, and 351C, 352C) surrounding each of the base plates 321A, 321B, 321C by a common lift mechanism 350 (not shown in FIG. 4). The base plates are preferably ganged together by rigid bridges 421; however, a single plate can be used to support as many stacks as are included in a given implementation. Also, it is preferred that the lifting arms 351, 352 be ganged to move together in response to a signals associated with a single lift mechanism 350 as described above in connection with FIG. 3. Preferably, the operational logic responds to the load drive unit signal to deliver an optical disc from successive stacks in the respective supplies 160 prior to engaging the lift mechanism 350. In this way, the count of optical discs maintained in the respective vertical stacks remains within a prescribed tolerance, say, four discs, from one another.

Optionally, a return 430 can be disposed below the drive unit for receiving CDs once ejected from the drive unit 170, as at steps 252, 254.

The invention has been described in detail with particular reference to certain preferred embodiments thereof, but it will be understood that variations and modifications can be effected within the spirit and scope of the invention.

I claim:

1. In a digital copier machine of the type including a platen for capturing a source document in the form of digital data representative of the source document and including at least one paper bin for supplying paper onto which the digital data can be transformed into a printed image in response to signals issuing from a control unit based on selections made at an interface, the improvement comprising:
    a tray sized and positioned in the digital copier machine so as to occupy a space ordinarily reserved for the at least one paper bin, the tray including:
        an optical drive unit connectable to the control unit and configured to removably receive a removable digital storage medium in the form of an optical disc and further configured to perform read and write operations on any removable digital storage medium received therein; and
        a picker configured to deliver the removable digital storage medium from a supply of a plurality of removable digital storage media in the form of optical discs included within the tray to the drive unit in response to a load drive unit signal; and
    wherein the digital copier machine includes:
        a selector on the interface; and
        operational logic responsive to a user selection of the selector to issue the load drive unit signal and to convey the digital data between the control unit of the digital copier machine and the drive unit.

2. The digital copier machine of claim 1, wherein the drive unit receives removable digital storage media through either of first and second accesses, the first access being positioned within the tray and the second access being in a wall of the tray, the picker supplying media to be received at the first access and a user supplying media to be received at the second access, the first and second accesses being different than one another.

3. The digital copier machine of claim 1, wherein the operational logic comprises an executing software program.

4. The digital copier machine of claim 1, wherein the load drive unit signal is issued by the control unit.

5. The digital copier machine of claim 1, wherein the load drive unit signal is issued by the drive unit.

6. The digital copier machine of claim 1, wherein the picker is centrally positioned relative to plural supplies of respective pluralities of removable digital storage media.

7. The digital copier machine of claim 6, further comprising a base plate configured to seat at least one of the plural supplies.

8. The digital copier machine of claim 7, wherein the base plate is configured to seat two or more of the plural supplies.

9. The digital copier machine of claim 8, wherein the base plate is configured to seat the plural supplies in vertical stacks.

10. The digital copier machine of claim 9, further comprising a lift operative to simultaneously elevate the vertical stacks of removable digital storage media in each of the supplies.

11. The digital copier machine of claim 10, wherein the picker is governed by the operational logic to respond to the load drive unit signal so as to deliver removable digital storage media from each of the supplies such that the count of removable digital storage media in the vertical stacks of each supply is within a prescribed tolerance.

12. The digital copier machine of claim 11, wherein the prescribed tolerance is four removable digital storage media.

13. A method for controlling a job output of a digital copier machine of the type including a platen for capturing a source document in the form of digital data representative of the source document and including at least one paper bin for supplying paper onto which the digital data can be transformed into a printed image as an output medium, comprising the steps of:

providing a user interface having a display and a set of entry options, one of the entry options permitting a user to select the output medium for the job;

receiving a user selection through the user interface, the user selection setting the output medium for the job to be a removable digital storage medium in the form of an optical disc;

supplying the removable digital storage medium from a supply contained in a tray which is sized and positioned in the digital copier machine so as to occupy a space ordinarily reserved for the at least one paper bin;

automatically loading the removable digital storage medium from the supply onto an optical drive unit included within the tray in response to the user selection;

transferring a copy of the source document to the removable digital storage medium in the drive unit; and ejecting the digital storage medium from the drive unit into a return for retrieval from the tray.

14. The method of claim 13, including the additional step of processing the source document into a digital document format representative of the image on the source document.

15. The method of claim 14, including the additional step of processing the digital document format into a file format suitable for writing to the removable digital storage medium.

16. The method of claim 13, including the additional step of processing the digital document format into a file format suitable for writing to the removable digital storage medium.

17. The method of claim 13, including the additional steps of transferring a job identifier to the drive unit and writing data onto the removable digital storage medium that concerns the job identifier.

18. The method of claim 13, including the additional step of adding visible indicia to the exterior surface of the removable digital storage medium, the visible indicia including a job identifier.

19. In a digital copier machine of the type including a platen for capturing a source document in the form of digital data representative of the source document and including at least one paper bin for supplying paper onto which the digital data can be transformed into a printed image in response to signals issuing from a control unit based on selections made at an interface, the improvement comprising:

an optical drive unit connectable to the control unit and configured to removably receive a removable digital storage medium in the form of an optical disc and further configured to perform read and write operations on any removable digital storage medium received therein; and a picker configured to deliver the removable digital storage medium from a supply of a plurality of removable digital storage media in the form of optical discs to the drive unit in response to a load drive unit signal;

a selector on the interface; and operational logic responsive to a user selection of the selector to issue the load drive unit signal and to convey the digital data corresponding to the captured source document on the platen of the digital copier machine between the control unit of the digital copier machine and the drive unit.

20. The digital copier machine of claim 19, wherein the operational logic is further configured to issue subsequent load drive unit signals if the volume of digital data conveyed between the control unit and the drive unit exceeds the capacity of a first optical disc loaded in the optical drive unit.

* * * * *